Patented Dec. 9, 1947

2,432,419

UNITED STATES PATENT OFFICE 2,432,419

AZO HYDROXY AZA INDOLIZINES

Newton Heimbach, Johnson City, N. Y., assignor to General Aniline & Film Corporation, New York, N. Y., a corporation of Delaware No Drawing. Application April 19, 1944,
Serial No. 531,771

14 Claims. (Cl. 260—157)

This invention relates to azo dyestuffs, and more particularly to novel azo hydroxy aza-indolizine dyes and to a process of preparing the same.

It is an object of the present invention to prepare novel azo hydroxy aza-indolizine dyes useful as filter and anti-halation agents in photographic materials, and useful of many applications in the industrial art. Further objects will be apparent by reference to the following specification, in which its preferred details and embodiments are described.

The novel dyes of this invention are characterized by a structure corresponding to the following general formula:

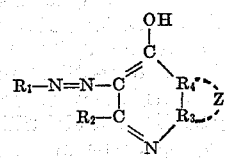

wherein $R_1$ is an aryl group, e. g. phenyl, naphthyl, diphenyl, anthranyl, etc., or a heterocyclic group, e. g. thiazole, oxazole, pyrazole, etc., $R_2$ is alkyl, e. g. methyl, ethyl, propyl, or higher alkyl group e. g. heptyl, octyl, decyl, dodecyl, stearyl, or an aryl group, e. g. phenyl, naphthyl, diphenyl, anthranyl, etc., or an aralkyl group, e. g. benzyl, or methyl naphthyl group; $R_3$ and $R_4$ is nitrogen or carbon, and Z represents the atoms necessary to complete an aza-indolizine ring. Thus, the portion of the above general formula represented by:

has, for example, the following configurations:

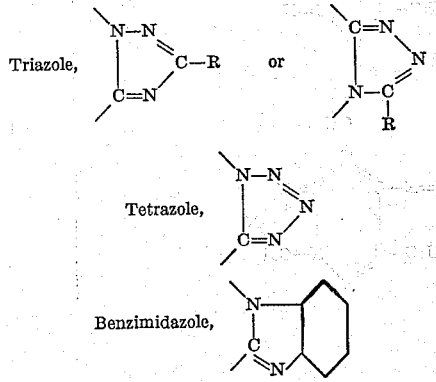

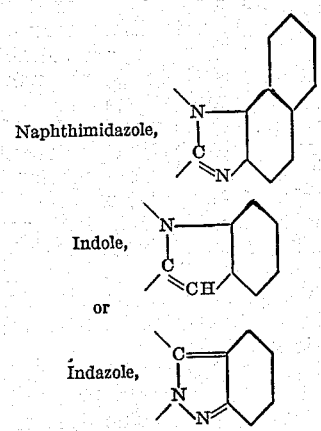

etc., wherein R may be hydrogen or alkyl group, e. g. methyl, ethyl, propyl, etc., or aryl, e. g. phenyl, naphthyl, etc.

The various aryl groups in the general formula, e. g. aryl $R_1$ and $R_2$ groups, and aryl radicles contained in Z above, may themselves be substituted. Thus, for example, the aryl groups may contain hydroxy, nitro, azo, alkoxy, carboxyl, arsonic acid, sulfonic acid and other conventional aryl substituents.

According to the present invention, these dyestuffs are prepared by a condensation of an azo-β-keto ester with an amino azole or an amino indole having an imino or methenyl group adjacent to the atom containing the amino substituent, said amino and imino or methenyl groups containing sufficiently reactive hydrogen to allow ring closure during the reaction with the azo-β-keto ester.

The amino azoles or amino indoles may be more clearly defined as containing the group

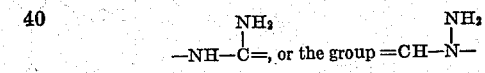

During the reaction with an azo-β-keto ester in a suitable solvent, such as glacial acetic acid, ring closure is effected at the amino group and at the imino or methenyl group, splitting out water and alcohol to form the desired azo hydroxy aza-indolizine dye.

As examples of suitable amino azoles and amino indoles according to this invention may be mentioned 3-amino-1,2,4-triazole, 2-aminobenzimidazole, 3-aminoindazole, 4-amino-1,2,4-triazole, 2-aminoindole, aminonaphthimidazole, 5 - aminotetrazole, 3-amino-5-methyl-1,2,4-triazole, etc.

Suitable azo-β-keto esters are, for example, benzolazo-acetoacetic ester, 4-sulfobenzolazo-acetoacetic ester, 5-sulfonaphthylene-1-azo-acetoacetic ester, 4-nitrobenzolazo-acetoacetic ester, 4-sulfobenzolazo-benzoylacetic ester, 4-carboxybenzolazo-[4-nitrobenzoyl]-acetic ester, benzoxazole-2-azo-acetoacetic ester, 4-hydroxy-benzolazo-acetoacetic ester, 4-sulfo-2-hydroxy-naphthalene-1-azo-acetoacetic ester, 3-5-dicarboxybenzol-1-azo-acetoacetic ester, thiazole-2-azo acetoacetic ester, etc.

The above azo-β-keto esters are prepared by the conventional method, e. g. diazotizing the corresponding amine and coupling the diazonium salt with the desired β-keto ester. The preparation of benzolazo acetoacetic ester, nitrobenzolazo acetoacetic ester and carboxybenzolazo acetoacetic ester, for example, are described respectively in Ber. 10, 2075, Ber. 30, 1968, and Ber. 41, 2365. In general, all of the desired azo-β-keto esters may be prepared under the conditions prescribed in these references.

A large variety of amines are suitable for the preparation of azo-β-keto esters, such as those described above. Among these may be mentioned sulfanilic acid, 1-naphthylamine-5-sulfonic acid, diaminotoluene sulfonic acid, nitroaniline sulfonic acid, arsanilic acid, 2-aminothiazole, 2-aminobenzoxazole, 1-amino-2-naphthol-4-sulfonic acid, aminoisophthalic acid, 4-nitroaniline, 4-aminophenol, 1-naphthylamine-5,7-disulfonic acid, etc.

As suitable β-keto esters, may be mentioned acetoacetic ester, benzoylacetic ester and p-nitrobenzoylacetic ester, etc.

The condensation between the azo-β-keto esters and the aminoazoles or aminoindoles to produce the azo hydroxy azaindolizine dyes of the present invention is carried out by heating the reaction components at a temperature ranging from 100° to 120° C., preferably at reflux temperature in the presence of a solvent, such as glacial acetic acid, and the like, for a period of three to eight hours. During this treatment water and alcohol are formed as the condensation or ring closure between the reactants proceeds. The final dye either precipitates from solution during the course of the reaction or is recovered by diluting the solvent or salting out with a suitable agent, such as sodium acetate. The resulting compounds have varying degrees of water solubility, depending upon the solubilizing substituents in the aryl groups.

The azo hydroxy aza-indolizine dyes of this invention are further characterized by their ability to form insoluble heavy metal salts, e. g. silver, lead and mercury salts, due to the presence of a hydroxy salt-forming group on the carbon atom adjacent to the $R_4$ atom of the general configuration described above.

Thus, for example, in the presence of silver ions insoluble silver salts are formed. This insoluble hydroxy silver salt formation is wholly unexpected and surprising, particularly in the presence of solubilizing substituents in the molecule, such as carboxyl or sulfonic acid groups.

These silver salts, moreover, are soluble in photographic processing baths, such as sodium thiosulfate. Accordingly, the dyes of this invention are readily applicable as non-diffusing photographic filter and anti-halation agents in photographic materials in the form of their silver salts. The dyes may be incorporated directly into the photographic emulsion or applied in a known manner underneath the emulsion layer, intermediate layer between the support and emulsion, as a backing layer on the rear surface of the emulsion support, or as an interlayer between the two emulsion layers.

The dyes are further useful in pharmaceutical applications due to their ability to form mercury salts. Their solubility in a suitable oil base or other desired solvent may be conveniently modified for pharmaceutical purposes by the choice of appropriate solubilizing substituents.

Further useful applications of the azo hydroxy aza-indolizines of the present invention are found in the aqueous dyeing of textiles and allied products. They are particularly valuable for their capacity to impart deep and brilliant colors to the fiber. The dyes, furthermore, exhibit excellent light and heat stability for textile dyeing purposes.

Specific compounds which have been prepared by the reactions hereinafter described are the following, it being understood that they are exemplary only and that they may contain other substituent groups as well as those included in these formulae.

| | Formula of Azo Hydroxy Aza-Indolizine | Color of Dye |
|---|---|---|
| 1 | 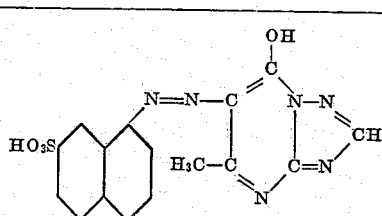 | Yellow. |
| 2 | 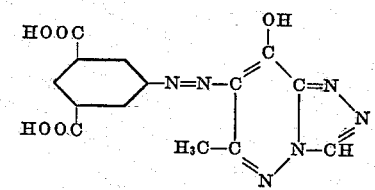 | Do. |

| | Formula of Azo Hydroxy Aza-Indolizine | Color of Dye |
|---|---|---|
| 3 | | Orange. |
| 3a | | Yellow. |
| 4 | | Magenta. |
| 5 | | Yellow. |
| 6 | | Do. |
| 7 | | Do. |
| 8 | | Do. |
| 9 | | Do. |
| 10 | | Orange. |

| Formula of Azo Hydroxy Aza-Indolizine | Color of Dye |
|---|---|
| 11 (structure) | Yellow. |
| 12 (structure) | Do. |
| 13 (structure) | Orange-Red. |

The following examples are intended to illustrate the preparation of compounds disclosed above. It will be appreciated that the conditions of reaction, e. g. proportions of reacting ingredients, times of reaction, and temperature, may be varied and that supplementary processes of purification and the like may be resorted to wherever found desirable. These and other variations and modifications will be evident to those skilled in the art in the light of the guiding principles which I disclose herein.

EXAMPLE I

One-tenth (0.1) mol (30.3 grams) of α-naphthylamine-5,7 disulfonic acid was diazotized with 0.11 mol (7.7 grams) sodium nitrite and 0.3 mol (11.0 grams) of hydrochloric acid at 0–5° C. The diazonium salt was coupled with a solution of 0.1 mol (13.0 grams) acetoacetic ester and 0.2 mol (8.0 grams) sodium hydroxide at 0° C. After allowing to stand for 15 minutes, the yellow sodium salt of the azo-keto ester intermediate was precipitated in 90% yield by the addition of sodium acetate. The crude ester intermediate was dried in vacuum at room temperature and then refluxed in glacial acetic acid (150 cc.) with 0.1 mol (8.4 grams) 3-amino-1,2,4 triazole for 6 hours. The sodium salt of the azo hydroxy aza-indolizine corresponding to Formula 1 precipitated during the course of the reaction. Purification was accomplished by recrystallization from water in the presence of sodium acetate. Total overall yield of pure dye was 75%. The dye is water soluble and has a yellow color.

EXAMPLE II

The azo ester intermediate of Formula 2 was prepared in the same manner as in Example I, except that the compound precipitated from the cold solution as the free acid without the addition of sodium acetate. The azo intermediate was condensed as in Example I, using in this case 8.4 grams 4-amino-1,2,4-triazole. The sodium salt of the dye corresponding to Formula 2 dissolves to a yellow solution.

EXAMPLE III

The azo hydroxy aza-indolizine dye corresponding to Formula 3 was prepared in a similar manner as in Example I. Twenty (20) grams 2,6-diaminotoluene-4-sulfonic acid were diazotized with 15 grams sodium nitrite in the presence of hydrochloric acid. The diazonium salt was coupled with 26 grams of acetoacetic ester in alkaline solution at 0° C. The resulting orange red azo ester intermediate was refluxed with 16.8 grams 3-amino-1,2,4 triazole in 150 cc. glacial acetic acid for 3 to 4 hours. The dye was precipitated by the addition of ether and recrystallized from a small volume of water. The dye had a red color and dissolved to an orange solution.

EXAMPLE IV

The azo hydroxy aza-indolizine dye corresponding to Formula 4 was prepared in the following manner:

p-Nitro aniline-o-sulfonic acid (21.8 grams) was diazotized with one equivalent (7.5 grams) of sodium nitrite and hydrochloric acid. The diazonium salt thus formed was then coupled with acetoacetic ester as in the previous examples. The sodium salt of the azo-ester intermediate precipitated as deep yellow crystals upon the addition of sodium acetate. The azo ester intermediate was coupled with 8.4 grams of 3-amino-1, 2,4-triazole in 150 cc. glacial acetic acid by refluxing for 4 to 5 hours. The product was recovered as the sodium salt and recrystallized from water in the presence of sodium acetate.

The sodium salt of the nitrophenylazo aza-indolizine compound was dissolved in excess aqueous ammonia and saturated with hydrogen sulfide at 30–40° C. The mixture was allowed to digest for 2 hours at 40° C., and allowed to stand overnight at room temperature.

During this period a color change from deep red to yellow occurred. Excess ammonia and hydrogen sulfide were then removed by evaporation on a steam bath. Upon addition of sodium acetate, the reduced yellow amino phenyl azo hydroxy aza-indolizine precipitated from solution.

The dried crude amino compound was diazotized with one equivalent of sodium nitrite in hydrochloric acid solution and coupled directly with an alkaline solution of α-naphthol-4,8-disulfonic acid to a deep magenta solution. The dye was precipitated with sodium acetate and recrystallized from water. It had a dark green color and dissolved in water to a brilliant magenta solution.

EXAMPLE V

A photographic filter layer was prepared by mixing the following ingredients to form a colored silver salt dispersion in gelatin:

*Solution A*

| | |
|---|---|
| 6, [5,7-disulfonaphthalene-1-azo] 7-hydroxy 5-methyl 1,3,4-triazaindolizine (Formula 1) _____grams__ | 4.7 |
| Water _____cc__ | 100 |
| Sodium carbonate (anhydrous) ____grams__ | 2.1 |
| Gelatin (10% solution) _____cc__ | 25 |

*Solution B*

| | |
|---|---|
| Water _____cc__ | 100 |
| Silver nitrate _____grams__ | 1.7 |

*Solution C*

| | |
|---|---|
| Gelatin (10% solution) _____cc__ | 100 |

Solution B was added to solution A with rapid stirring. After several minutes, solution C was added. The silver of the silver nitrate formed a silver salt with the hydroxy group of the dye in the gelatin solution. The final gelatin suspension thus obtained was then coated on a photographic film in the customary manner to serve as a yellow filter layer for blue light absorption. The silver salt of the dye is non-diffusing.

The amount of hydroxy indolizine dye used according to the present invention will vary somewhat, depending upon the color intensity desired. In general, an amount more or less than that given in Example V may be used for satisfactory results.

EXAMPLE VI

A photographic anti-halation layer was prepared by mixing the following ingredients to form a colored silver salt dispersion in gelatin:

*Solution A*

| | |
|---|---|
| 5-[3,5-dicarboxybenzol-1-azo] 4-hydroxy-6-methyl-2,3, 7-triazaindolizine (Formula 2) _____grams__ | 7.0 |
| Water _____cc__ | 200 |
| Sodium hydroxide (4%) _____cc__ | 7.5 |
| Gelatin (10% solution) _____cc__ | 100 |

*Solution B*

| | |
|---|---|
| Water _____cc__ | 100 |
| Silver nitrate _____grams__ | 3.4 |

*Solution C*

| | |
|---|---|
| Gelatin (10% solution) _____cc__ | 300 |

Solution B was added to solution A with rapid stirring. After several minutes, solution C was added. The final gelatin suspension of the silver salt thus obtained was coated on a support in the customary manner as an anti-halation layer.

The filter and anti-halo coatings prepared as described above have been found to have particularly good filter and anti-halant properties and to have no effect on the normal keeping properties of the light-sensitive layer.

EXAMPLE VII

The dye corresponding to Formula 8 was prepared by the following procedure:

One-tenth (0.1) mol (44.5 grams) of 5,7-disulfonapthalene-1-azo-acetoacetic ester prepared as in Example I was refluxed with 0.1 mol (13.3 grams) of 2-aminobenzimidazole for 5 hours. During the course of the reaction the crude product precipitated from solution. Purification was accomplished by recrystallization from water in the presence of sodium acetate. Total yield of pure dye 65-70%. The dye dissolves in water to a brilliant yellow solution.

EXAMPLE VIII

The dye corresponding to Formula 9 was prepared by the following procedure:

One-tenth (0.1) mol (35.8 grams) of 4-arsonic acid benzol-1-azoacetoacetic ester was prepared in the prescribed manner. The yellow azo-β-keto ester intermediate precipitated from water solution. The dried product was refluxed in glacial acetic acid with 0.1 mol (13.3 grams) of 2-aminobenzimidazole for 5 hours. On cooling the deep yellow azo hydroxy aza-indolizine dye precipitated from solution. A second crop was recovered by dilution of the filtered solution with several volumes of cold water. After recrystallization from hot water the total yield was 70%. The dye is somewhat water soluble and considerably more soluble as the sodium salt. The water solution of the sodium salt has a brilliant yellow color.

EXAMPLE IX

The dye corresponding to Formula 11 was prepared as follows:

One-tenth (0.1) mol (33.2 grams) of 4-sulfobenzolazoacetoacetic ester was refluxed with 0.1 mol (13.0 grams) of 2-aminoindol for 4 hours in glacial acetic acid. The dye was precipitated by dilution with ether and recrystallized from a small volume of water. Total yield was 75%. The dye dissolves in water to a bright yellow solution.

While the present invention has been described in considerable detail with reference to certain preferred procedures, materials, and uses, it is understood that the class of dyes and their applications is not limited thereto and that all related modifications and variations are within the scope of the invention as defined by the appended claims.

I claim:

1. An azo dyestuff selected from the class consisting of azo dyestuffs having the following formulae:

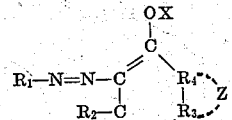

and

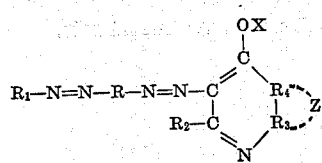

wherein R is a radical of the benzene series, $R_1$ represents a member selected from the group consisting of aryl and heterocyclic groups, $R_2$ represents a member selected from the group consisting of alkyl, aryl, and aralkyl groups, $R_3$ and $R_4$ are selected from the group consisting of carbon and nitrogen, $R_3$ being carbon when $R_4$ is nitrogen, and $R_3$ being nitrogen when $R_4$ is carbon, Z, represents the atoms necessary to complete an aza-indolizine ring, and X is selected from the class consisting of hydrogen and a heavy metal.

2. The process of producing azo dyestuffs selected from the class consisting of azo hydroxy aza-indolizines having the following formulae:

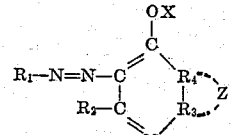

and

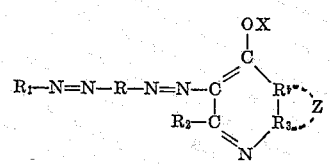

wherein R is a radical of the benzene series, $R_1$ represents a member selected from the group consisting of aryl and heterocyclic groups, $R_2$ represents a member selected from the group consisting of alkyl, aryl, and aralkyl groups, $R_3$ and $R_4$ are selected from the group consisting of carbon and nitrogen, $R_3$ being carbon when $R_4$ is nitrogen and $R_3$ being nitrogen when $R_4$ is carbon, and Z represents the atoms necessary to complete an aza-indolizine ring, which comprises heating an azo-substituted-$\beta$-keto ester with a heterocyclic base selected from the class consisting of amino azoles and amino indoles in which the amino group is linked to the 5-membered azole and indole ring.

3. A new chemical compound corresponding to the formula:

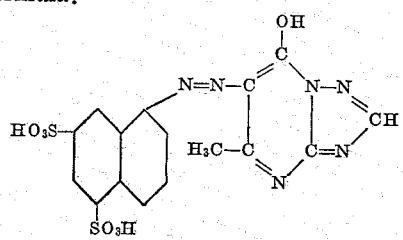

and its hydroxy heavy metal salt.

4. A new chemical compound corresponding to the formula:

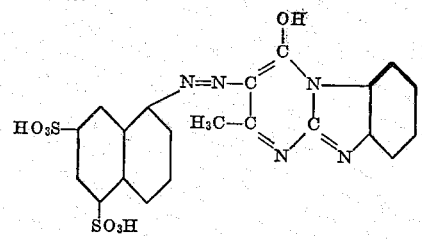

and its hydroxy heavy metal salt.

5. A new chemical compound corresponding to the formula:

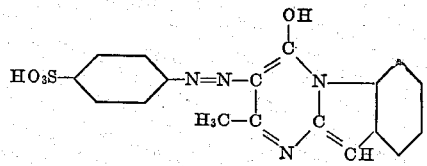

and its hydroxy heavy metal salt.

6. The process according to claim 2 which comprises heating one mole of an azo-substituted-$\beta$-keto ester with one mol of a heterocyclic base selected from the class consisting of amino azoles and amino indoles in which the amino group is linked to the 5-membered azole and indole ring.

7. The process according to claim 2 wherein the amino azole is an amino triazole in which the amino group is linked to the 5-membered triazole ring.

8. The process of producing an azo hydroxy aza-indolizine which comprises heating one mol of 5,7-disulfonaphthalene-1-azo acetoacetic ester with one mol of 3-amino-1,2,4-triazole.

9. The process of producing an azo hydroxy aza-indolizine which comprises heating one mol of 5-sulfonaphthalene-1-azo-acetoacetic ester with one mol of 2-aminobenzimidazole.

10. The process of producing an azo hydroxy aza-indolizine which comprises heating one mol of 4-sulfobenzolazo acetoacetic ester with one mol of 2-aminoindole.

11. The process according to claim 2 wherein the heating is conducted at reflux temperature in the presence of glacial acetic acid.

12. The process according to claim 8 wherein the heating is conducted at reflux temperature in the presence of glacial acetic acid.

13. The process according to claim 9 wherein the heating is conducted at reflux temperature in the presence of glacial acetic acid.

14. The process according to claim 10 wherein the heating is conducted at reflux temperature in the presence of glacial acetic acid.

NEWTON HEIMBACH.

REFERENCES CITED

The following references are of record in the file of this patent:

Beilstein, Handbuch, 4th edition, vol. 26, pages 342, 594.

Chemical Abstracts, vol 30, page 3431, citing: Heisaburo Kondo et al., Journal Pharm. Soc. Japan, vol. 56, 1–6 (1936). (Copy in Dept. of Agr. Libr.)